United States Patent
Shinohara et al.

(10) Patent No.: US 6,194,515 B1
(45) Date of Patent: Feb. 27, 2001

(54) POLYACETAL COMPOSITION WITH IMPROVED TOUGHNESS

(75) Inventors: Kenichi Shinohara, Tochigi (JP); Edmund Arthur Flexman, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 08/948,882

(22) Filed: Oct. 10, 1997

(51) Int. Cl.⁷ ..................................................... C08L 59/00
(52) U.S. Cl. ................. 525/92 A; 525/92 H; 525/92 K; 525/92 L; 525/472; 428/35.2; 428/35.5; 428/35.7; 428/36.9; 428/524
(58) Field of Search ................................ 525/92 H, 92 K, 525/92 A, 472, 92 L, 91; 528/230; 428/35.2, 35.5, 35.7, 36.9, 524

(56) References Cited

U.S. PATENT DOCUMENTS

| | | |
|---|---|---|
| 4,017,558 | 4/1977 | Schmidt et al. . |
| 4,243,580 | 1/1981 | Gale . |
| 4,277,577 | 7/1981 | Burg et al. ............................. 525/154 |
| 4,377,667 | 3/1983 | Sakurai et al. ........................ 525/400 |
| 4,382,994 | 5/1983 | Matsumi ............................... 428/411 |
| 4,559,380 | 12/1985 | Kasuga et al. ....................... 524/317 |
| 4,596,847 | 6/1986 | Kasuga et al. ....................... 524/220 |
| 4,795,477 | 1/1989 | Kusumgar et al. ....................... 8/471 |
| 5,030,668 | 7/1991 | Wagman ............................... 523/209 |
| 5,106,888 | 4/1992 | Kosinski ................................ 524/35 |
| 5,187,218 | 2/1993 | Masumoto et al. .................. 524/317 |
| 5,354,810 | 10/1994 | Nagasaki et al. ....................... 525/64 |
| 5,420,170 | 5/1995 | Lutter et al. .......................... 521/159 |
| 5,432,216 | 7/1995 | Yu et al. ............................... 524/102 |
| 5,446,086 | 8/1995 | Sugiyama et al. ................... 524/542 |

FOREIGN PATENT DOCUMENTS

| | | |
|---|---|---|
| 0432888 | 6/1991 | (EP) . |
| 595099 | 5/1994 | (EP) . |
| 50-010841 | 2/1975 | (JP) . |
| 50-010842 | 2/1975 | (JP) . |
| 52-047046 | 4/1977 | (JP) . |
| 56-076424 | 6/1981 | (JP) . |
| 56-163144 | 12/1981 | (JP) . |
| 57-128740 | 8/1982 | (JP) . |
| 60-013809 | 1/1985 | (JP) . |
| 60-042449 | 3/1985 | (JP) . |
| 61-123652 | 6/1986 | (JP) . |
| 61-141752 | 6/1986 | (JP) . |
| 61-200153 | 9/1986 | (JP) . |
| 61-238897 | 10/1986 | (JP) . |
| 64-54053 | 3/1989 | (JP) . |
| 02166120 | 6/1990 | (JP) . |
| 3-21657 | 1/1991 | (JP) . |
| 03079618 | 4/1991 | (JP) . |
| 03292314 | 12/1991 | (JP) . |
| 04306215 | 10/1992 | (JP) . |
| 05009306A | 1/1993 | (JP) . |
| 05051514 | 3/1993 | (JP) . |
| 6-192541 | 7/1994 | (JP) . |
| 06293857 | 10/1994 | (JP) . |
| 7-11101 | 1/1995 | (JP) . |
| 7-109403 | 4/1995 | (JP) . |
| 8-176399 | 7/1996 | (JP) . |
| 8-183115 | 7/1996 | (JP) . |
| 8-259779 | 10/1996 | (JP) . |
| 8-325431 | 12/1996 | (JP) . |
| 05009363 | 1/1997 | (JP) . |
| 09111097 | 4/1997 | (JP) . |
| WO 95/29957 | 11/1995 | (WO) . |

OTHER PUBLICATIONS

SU 1082790, Mar. 1984 Abstract (WPAT).

Primary Examiner—Mark L. Warzel

(57) ABSTRACT

To provide a polyacetal composition with improved toughness, wear resistance, and flowability. The polyacetal composition contains 100 wt % of polyacetal and 0.5–5 wt % of a block copolymer, which has its central portion made of an amorphous polymer that forms an elastic domain at room temperature and which has polyethylene glycol chains with molecular weight of 2000 or higher at its two ends.

10 Claims, No Drawings

POLYACETAL COMPOSITION WITH IMPROVED TOUGHNESS

BACKGROUND OF THE INVENTION

This invention pertains to a polyacetal composition with improved toughness, wear resistance, and flowability. More specifically, this invention pertains to a polyacetal composition which allows molding of thin-wall parts and can form sliding parts with excellent toughness.

Polyacetal (otherwise known as polyoxymethylene) is a well-known polymer having a good balance of physical properties, such as excellent sliding characteristics, and good flowability in molding. It is frequently used in manufacturing gears, zippers, buckles, cassette hubs, and other mechanical parts.

Various efforts have been made to realize further improvement of the characteristics of polyacetals. For example, as a composition with better impact strength than polyoxymethylene, there is a type of composition prepared by adding thermoplastic polyester elastomer and copolymer of ethylene oxide and propylene oxide to polyoxymethylene (Japanese Kokai Patent Application No. Sho 52[1977]-47046). As a type of polyoxymethylene with high thermal stability and excellent gloss-less surface appearance, there is a composition prepared by adding calcium silicate and a block copolymer of ethylene oxide and propylene oxide into polyoxymethylene (Japanese Kokai Patent Application No. Sho 64[1989]-54053). As a polyacetal composition with excellent dimensional stability after molding, there is a composition prepared from polyacetal copolymer and polyacetal in which one of the terminals of the linear polymers made of a repetition of oxymethylene units is blocked by an alkylene oxide adduct on alcohol (Japanese Kokai Patent Application No. Hei 3[1991]-21657). As a polyoxymethylene composition with improved acid resistance, there is a composition containing polyoxymethylene, polyethylene glycol with a molecular weight of 5000 or smaller, and/or polypropylene glycol and/or polybutylene glycol (Japanese Kokai Patent Application No. Hei 6[1994]-192541). As a polyacetal composition with excellent anti-static characteristics, surface characteristics, and moldability, there is a composition containing polyacetal, polyethylene glycol, and other aliphatic polyethers and phenol-based polymeric compound (Japanese Kokai Patent Application No. Hei 7[1995]-11101). As a composition for which there is no squeaking noise among the moldings made of it when they rub with each other and for which the appearance of the moldings is good, there is a composition made of polyoxymethylene, olefin compound, and polyalkylene glycol (Japanese Kokai Patent Application No. Hei 7[1995]-109403). As a polyoxymethylene composition having good sliding property under high load and at high temperature, there is a composition made of polyoxymethylene, ethylene-α-olefin copolymer with a melting point in the range of 40–80° C., and tetramethylene glycol-ethylene glycol copolymer or liquid ethylene-α-olefin random copolymer (Japanese Kokai Patent Application No. Hei 8[1996]-176399). As a composition for molding the hinge parts made of a polyacetal resin with improved hinge characteristics for a practical application, there are the following types of compositions: a polyacetal composition containing an oxyalkylene polymer with molecular weight in the range of 10,000–300,000, for example an ethylene oxide/propylene oxide copolymer (Japanese Kokai Patent Application No. Hei 8[1996]-183115); a composition prepared by adding oxyalkylene polymer with a molecular weight of 1000 or higher and an isocyanate compound or its modified compound into a polyacetal (Japanese Kokai Patent Application No. Hei 8[1996]-259779); and a polyacetal composition prepared by adding a core-shell polymer with a rubber-like polymer as the core and glass-like polymer as the shell and oxyalkylene polymer with a molecular weight in the range of 10,000–300,000 and having 2–8 carbon chains adjacent to each other (Japanese Kokai Patent Application No. Hei 8[1996]-325431).

For a polyacetal, as it has a high crystallinity, and although a high strength can be realized, the toughness is insufficient. Consequently, it becomes brittle in a severe environment such as low temperature, repeated load, etc. This problem is particularly significant for a polyacetal with a low molecular weight and high flowability. For example, for zippers, cassette hubs, chassis parts, buckles, clips, etc., the materials should have good flowability so as to have a good productivity and should have high toughness so as to withstand damage caused by impact. However, there has not been found a polyacetal having such properties.

Consequently, there is a demand for development of a polyacetal composition with excellent wear resistance, good flowability, and improved toughness.

The purpose of this invention is to provide a polyacetal composition which has excellent wear resistance, flowability, and toughness so that it can form moldings having excellent durability in severe environments.

Another purpose of this invention is to provide a polyacetal composition which also has high thermal stability in addition to the aforementioned characteristics.

SUMMARY OF THE INVENTION

To realize this purpose, extensive research has been conducted. As a result of this research, it was found that the toughness can be improved significantly in a polyacetal composition when a block copolymer is added to a polyacetal wherein the block copolymer has polyethylene glycol chains having good compatibility with the polyacetal at its two ends and which has a domain that can absorb the stress by the elastic behavior at its central portion.

One embodiment of this invention provides a polyacetal composition which contains about 95–99.5 wt % of polyacetal and about 0.5–5 wt % of a block copolymer which has its central portion made of an amorphous polymer that forms an elastic domain at room temperature and further wherein the block copolymer has polyethylene glycol chains with a molecular weight of 2000 or higher at its two ends.

Another embodiment of this invention provides a polyacetal composition which contains about 80–99.3 wt % of a polyacetal; about 0.5–5 wt % of a block copolymer which has its central portion made of an amorphous polymer that forms an elastic domain at room temperature and which has polyethylene glycol chains with a molecular weight of 2000 or higher at its two ends; and about 0.2–15 wt % of a compound having epoxy groups and/or oxazolyl groups.

Yet another embodiment of this invention provides the polyacetal compositions described above wherein the block copolymer includes an alkali metal or alkaline-earth metal in a concentration of 200 ppm or less.

This invention further provides the polyacetal composition described above. The amorphous polymer is polypropylene glycol with a molecular weight of 2000 or higher.

DETAILED DESCRIPTION OF THE INVENTION

The polyacetal composition of this invention includes a polyacetal, a block copolymer and optionally a compound having epoxy groups and/or oxazolyl groups.

The polyacetal component used herein includes polyacetal homopolymers such as homopolymers of formaldehyde or of cyclic oligomers of formaldehyde, the terminal groups of which are end-capped by esterification or etherification, polyacetal copolymers such as copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification, or a mixture of such homopolymers and copolymers. End-capping is generally done to prevent the polyacetal from "unzipping" as it tends to do at elevated temperatures. Polyacetal copolymers contain at least one comonomer. Comonomers commonly used in preparing polyacetal copolymers include alkylene oxides of 2–12 carbon atoms and their cyclic addition products with formaldehyde. The quantity of comonomer is generally not more than about 20 wt %, preferably not more than about 15 wt %, and most preferably about 2 wt %. The most common comonomers are ethylene oxide, dioxylane and butylene oxide. The preferred homopolymers include those whose terminal hydroxyl groups have been end-capped by a chemical reaction to form ester or ether groups, preferably acetate or methoxy groups, respectively. However, for the polyacetal copolymers, if lubricants, etc., are added to the composition the properties (tensile characteristics, Izod impact characteristics, flexural characteristics, compression characteristics, etc.), deteriorate. Consequently, it is preferred that the polyacetal homopolymer be used. Also, the polyacetal composition of this invention should have a number average molecular weight in the range of 10,000–100,000, or preferably in the range of 20,000–90,000, or more preferably in the range of 25,000–70,000.

The block copolymer added to the polyacetal composition has its central portion made of an amorphous polymer that forms an elastic domain at room temperature and which has polyethylene glycol chains with a molecular weight of 2000 or higher at its two ends.

The amorphous polymer that forms the elastic domain at room temperature refers to the amorphous polymer which can form a portion with an elastic behavior that can absorb the stress in the temperature range of −40° C. to 50° C. for the environment in which polymeric materials are usually used. An example of the amorphous polymer is a polypropylene glycol with a molecular weight of 2000 or higher, or preferably polypropylene glycol with a molecular weight of 3000 or higher.

A preferred embodiment is one in which the block copolymer has the central portion as an elastic domain at room temperature and has ethylene glycol chains at the ends, the central portion is made of polypropylene glycol with a molecular weight of 2000 or higher, and the two ends are made of polyethylene glycol chains. In addition, only for A-B-A block copolymers with two ends chemically bonded with polyethylene glycol chains with a molecular weight of 2000 or higher, or preferably 4000 or higher, can a sufficient compatibility be realized with the polyacetal.

Other examples of the amorphous polymers that can form an elastic domain at room temperature include dimethylsiloxane and other silicone polymers or polytetramethylene glycols. Molecular weight requirements necessary for these amorphous polymers to develop an elastomeric character may be different than the molecular weight requirements of polypropylene glycol.

In the polyacetal composition of this invention, the amount of the block copolymer should be in the range of about 0.5–5 wt %, or preferably in the range of about 1–5 wt %, or more preferably in the range of about 1–3 wt %. If the amount of block copolymer is less than about 0.5 wt %, improvement in the toughness is insufficient. On the other hand, if the amount of block copolymer is over about 5 wt %, the flowability deteriorates.

When the block copolymer is prepared, usually an alkali metal salt or alkaline-earth metal salt is used as a catalyst. However, if a large amount of such salts is left in the polymer, thermal deterioration of polyacetal is accelerated, causing problems in molding. Consequently, it is preferred that the amount of the catalyst be controlled so that the concentration of alkali metal or alkaline-earth metal in the block copolymer is 200 ppm or less.

In the polyacetal composition of this invention, the amount of the compound having epoxy groups, oxazolyl groups, or both epoxy and oxazolyl groups should be in the range of about 0.2–15 wt %. These compounds may be low molecular weight compounds or high molecular weight compounds. The content is preferably in the range of about 0.5–10 wt %, or more preferably in the range of about 0.5–3 wt %. If the amount is less than about 0.2 wt %, it is impossible to effectively stabilize the acid component that causes thermal degradation. On the other hand, if the amount is more than about 15 wt %, the wear resistance becomes poor.

Examples of compounds having epoxy groups include styrene/glycidyl methacrylate random copolymer, ethylene/glycidyl methacrylate random copolymer, ethylene/ethyl acrylate/glycidyl methacrylate tertiary random copolymer, ethylene/butyl acrylate/glycidyl methacrylate tertiary random copolymer, ethylene/vinyl acetate/glycidyl methacrylate tertiary random copolymer, etc., as well as the conventional epoxy resins, such as epoxy novolac resin, bisphenol A epoxy resin, aliphatic epoxy resin, etc.

Examples of the compounds having oxazolyl groups include 2-vinyl-2-oxazoline/styrene random copolymer, 2-vinyl-2-oxazoline/methyl methacrylate random copolymer, and other polymers, as well as 2-ethyl-oxazoline, 2-octyl-2-oxazoline and various other alkyl-2-oxazoline, etc. In these compounds, the oxazoline rings may also contain substituents.

These compounds may be used either alone or as a mixture of two or more types.

Also, the polyacetal composition of this invention may contain various additives for adding conventionally to the polyacetal composition, such as anti-oxidants, UV absorbers, thermal stabilizers, coloring agents, mold-release agents, nucleating agents, etc., with amounts in the range that do not hamper the characteristics of the polyacetal composition.

The polyacetal composition of this invention can be prepared using any conventional method. For example, the following methods may be used: a method in which after various components are uniformly mixed, the mixture is kneaded and extruded by a single or twin-screw extruder to form pellets; a method in which compounds having different compositions are blended and pelletized, followed by kneading with polyacetal, and the like.

EXAMPLES

In the following, this invention will be explained in more detail with reference to application examples. However, this invention is not limited to these application examples.

Application Examples 1–15, Comparative Examples 1–7

The various components listed in Table I (in wt %) were dry blended, followed by melt blending at 200–210° C.

using a twin-screw extruder. After cooling with water, pellets were manufactured. The obtained pellets were used to mold dumbbell specimens measuring 13 mm×130 mm×3.2 mm.

The components used in the application examples and comparative examples are as follows.

POM-A: High flow polymer for general molding which is a polyacetal homopolymer with a number average molecular weight of about 30,000 and degree of dispersion (Mw/Mm) of 2.2 (Delrin® acetal resin 1700PNC10 manufactured by E. I. du Pont de Nemours and Co.)

POM-B: High flow polymer for general molding which is a polyacetal copolymer with number-average molecular weight of about 22,000 and degree of dispersion (Mw/Mm) of 3.5 (Duracon® M270-44 manufactured by Polyplastics Co)

EO/PO-A: A-B-A block copolymer containing polypropylene glycol chains (B) with a molecular weight of about 4000 and polyethylene glycol chains (A) with a molecular weight of about 8000 (Newpol® PE-108 manufactured by Sanyo-Kasei KK)

EO/PO-B: A-B-A block copolymer containing polypropylene glycol chains (B) with a molecular weight of about 3250 and polyethylene glycol chains (A) with a molecular weight of about 6500 (Newpol® PE-128 manufactured by Sanyo-Kasei KK)

EO/PO-C: A-B-A block copolymer containing polypropylene glycol chains (B) with a molecular weight of about 2050 and polyethylene glycol chains (A) with a molecular weight of about 4100 (Newpol® PE-78 manufactured by Sanyo-Kasei KK)

EO/PO-D: Polymer prepared by processing A-B-A block copolymer containing polypropylene glycol chains (B) with a molecular weight of about 3000 and polyethylene glycol chains (A) with a molecular weight of about 6000 by ceramics containing alkaline-earth metal, and reducing the amount of residual alkali metal (Na or K) to less than 10 ppm (Leocon® PF-308 manufactured by Lion KK)

PEG-A: Polyethylene glycol with a molecular weight of about 20,000

PEG-B: Polyethylene glycol with a molecular weight of about 6000

PPG: Polypropylene glycol with a molecular weight of about 6000

EBAGMA: 3-dimensional random copolymer of ethylene, n-butyl acrylate (BA), and glycidyl methacrylate (GMA) (with BA content of 30 wt %, GMA content of 5 wt %)

PS-Oxa: Styrene/2-vinyl-2-oxazoline (Oxa) random copolymer (Oxa content of 5 wt %)

TEPIC: tris-2,3-epoxypropyl isocyanate

EEA: Ethylene/ethyl acrylate (EA) copolymer (EA content of 35 wt %) (EVAFLEX® EEA A709 manufactured by Mitsui-DuPont Polychemical Co. Ltd)

HRP: Copolymer prepared by ethylene/ethylene acrylate (EA) (with EA content of 35%) which is modified with maleic anhydride as grafting agent (HRP AR-201 manufactured by Mitsui-DuPont Polychemical Co. Ltd)

Potassium content in EO/PO

The potassium ion (K) content in EO/PO block copolymers was determined according to CRP method (JAPANESE INDUSTRIAL STANDARD (JIS) K 1557). The measured values for EO/PO-A and EO/PO-B were

|  | EO/PO-A | EO/PO-B |
| --- | --- | --- |
| CRP | 26 | 291 |
| K (ppm) | 48.6 | 544.2 |

The melt viscosity, properties, and melt stability were measured as follows. The results of the measurements are listed in Table II.

Measurement of melt viscosity

The melt viscosity of the obtained pellets was measured using a capillary flow tester manufactured by Toyo Seiki K.K. With a cylinder temperature at 190° C., the polymer was melted uniformly for a holding time of 3 min, followed by measurement of the melt viscosity at various different shear speeds.

Property Tests

The following measurement methods were adopted.

Tensile strength: ASTM D638

Elongation at break: ASTM D638

Izod impact strength: ASTM D256 (notched)

Measurement of melt stability 1

About 2 g of pellets were loaded in a heat-resistant test tube. After setting a cap attached with a branch, nitrogen gas was blown in at a flow rate of about 200 mL/min. The tube was heated in an oil bath at 250° C. The formaldehyde gas generated by decomposition of polymer was absorbed by a 4% solution of sodium sulfite in another tube, and the amount was determined by titration using 0.1N hydrochloric acid. The percentage of the amount of formaldehyde generated in 30 min with respect to the loading amount was determined and taken as reduction in wt %.

Measurement of melt stability 2

About 10–20 mg of pellets were packed in a Thermogravimetric Analyzer (TGA) manufactured by DuPont Instruments Co. (TGA2950). After heating at 20° C./min to 240° C. and holding for 20 min, the reduction in wt % was derived.

TABLE I (wt %)

| | POM-A | POM-B | EO/PO-A | EO/PO-B | EO/PO-C | EO/PO-D | PEG-A | PEG-B | PPG | EBA GMA | PS-OXA | TEPIC | EEA | HRP |
| --- | --- | --- | --- | --- | --- | --- | --- | --- | --- | --- | --- | --- | --- | --- |
| Application Example 1 | 99.0 | | 1.0 | | | | | | | | | | | |
| Application Example 2 | 97.0 | | 3.0 | | | | | | | | | | | |
| Application Example 3 | 97.0 | | | 3.0 | | | | | | | | | | |
| Application Example 4 | | 97.0 | 3.0 | | | | | | | | | | | |
| Application Example 5 | 97.0 | | | | 3.0 | | | | | | | | | |

TABLE I-continued (wt %)

|  | POM-A | POM-B | EO/PO -A | EO/PO -B | EO/PO -C | EO/PO -D | PEG -A | PEG -B | PPG | EBA GMA | PS- OXA | TEPIC | EEA | HRP |
|---|---|---|---|---|---|---|---|---|---|---|---|---|---|---|
| Application Example 6 | 99.0 | | 1.0 | | | | | | | 1.0 | | | | |
| Application Example 7 | 96.0 | | | 3.0 | | | | | | 1.0 | | | | |
| Application Example 8 | 96.8 | | 3.0 | | | | | | | 0.2 | | | | |
| Application Example 9 | 92.0 | | 3.0 | | | | | | | 5.0 | | | | |
| Application Example 10 | 96.0 | | | 3.0 | | | | | | | 1.0 | | | |
| Application Example 11 | 96.8 | | | 3.0 | | | | | | | | 0.2 | | |
| Application Example 12 | 96.0 | | 3.0 | | | | | | | | | | 1.0 | |
| Application Example 13 | 96.0 | | | 3.0 | | | | | | | | | | 1.0 |
| Application Example 14 | 97.0 | | | | | 3.0 | | | | | | | | |
| Application Example 15 | 97.0 | | | 2.0 | | 1.0 | | | | | | | | |
| Comparative Example 1 | 99.5 | | 0.5 | | | | | | | | | | | |
| Comparative Example 2 | 93.0 | | 7.0 | | | | | | | | | | | |
| Comparative Example 3 | 97.0 | | | | | | 3.0 | | | | | | | |
| Comparative Example 4 | 99.0 | | | | | | | 1.0 | | | | | | |
| Comparative Example 5 | 97.0 | | | | | | | 3.0 | | | | | | |
| Comparative Example 6 | 97.0 | | | | | | | | 3.0 | | | | | |
| Comparative Example 7 | | 97.0 | | | | | | 3.0 | | | | | | |

TABLE II

|  | Tensile strength (Mpa) | Elongation at break (%) | Izod impact strength (J/m) | Melt viscosity at shear velocity of 122 sec$^{-1}$ | Melt viscosity at shear velocity of 3648 sec$^{-1}$ | Melt stability 1, in nitrogen, reduction in wt % | Melt stability 2, in air, reduction in wt % |
|---|---|---|---|---|---|---|---|
| Application Example 1 | 65.5 | 35.4 | 54.9 | 302 | 93 | 0.16 | 4.40 |
| Application Example 2 | 60.4 | 40.9 | 55.6 | 275 | 82 | 0.86 | 9.83 |
| Application Example 3 | 60.2 | 39.1 | 54.5 | 264 | 66 | 0.81 | 14.38 |
| Application Example 4 | 52.0 | 75.1 | 56.5 | 348 | 84 | 0.82 | 2.42 |
| Application Example 5 | 60.6 | 35.6 | 45.8 | 204 | 48 | 0.48 | 7.70 |
| Application Example 6 | 68.2 | 38.2 | 62.5 | 259 | 79 | 0.18 | 1.25 |
| Application Example 7 | 67.4 | 43.4 | 51.5 | 313 | 73 | 0.17 | 3.56 |
| Application Example 8 | 57.8 | 65.1 | 54.6 | 277 | 70 | 0.15 | 6.50 |
| Application Example 9 | 52.2 | 50.1 | 37.7 | 254 | 67 | 1.26 | 3.50 |
| Application Example 10 | 59.3 | 46.1 | 50.6 | 295 | 68 | 0.32 | 4.20 |
| Application Example 11 | 60.1 | 53.3 | 52.9 | 286 | 69 | 0.41 | 5.50 |
| Application Example 12 | 58.2 | 58.5 | 55.1 | 295 | 72 | 1.17 | 8.50 |
| Application Example 13 | 57.9 | 58.1 | 38.0 | 253 | 70 | 1.44 | 8.80 |
| Application Example 14 | 60.5 | 49.5 | 54.6 | 280 | 71 | 0.27 | 2.05 |
| Application Example 15 | 61.0 | 44.4 | 55.0 | 282 | 69 | 0.47 | 8.56 |
| Comparative Example 1 | 67.9 | 25.4 | 49.4 | 324 | 104 | 0.31 | 2.25 |
| Comparative Example 2 | 53.2 | 29.0 | 46.7 | 189 | 52 | 1.32 | 37.50 |
| Comparative Example 3 | 60.9 | 31.4 | 55.0 | 371 | 95 | 0.34 | 12.50 |
| Comparative Example 4 | 68.3 | 19.0 | 53.7 | 307 | 95 | 0.14 | 5.25 |
| Comparative Example 5 | 64.1 | 24.1 | 48.2 | 257 | 79 | 0.17 | 15.05 |
| Comparative Example 6 | — | — | — | 246 | 45 | 0.19 | 4.98 |
| Comparative Example 7 | 54.1 | 48.8 | 44.9 | 341 | 90 | 0.16 | 4.56 |

In Application Examples 1–15, a block copolymer, which has an amorphous polymer that forms an elastic domain at room temperature as its central portion and has polyethylene glycol chains with a molecular weight of 2000 or larger on its two ends, is added with a polyacetal, so that the elongation at break and impact resistance are improved, and the flowability is excellent for the compositions formed.

As can be seen from the comparison between Application Examples 1–2 and Comparative Example 3, when high molecular weight polyethylene glycol is added, although the impact strength is increased, the elongation at break is insufficient.

As can be seen from the comparison between Application Examples 1–2 and Comparative Examples 4, 5, and 7, when a low molecular weight polyethylene glycol is added, both elongation at break and impact strength are insufficient.

By comparing Application Example 5 and Comparative Example 6, it can be seen that in Application Example 5, with the molecular weight as low as 2000 for the amorphous polymer that forms the elastic domain at room temperature as the central portion, the melt viscosity tends to be lower. On the other hand, in Comparative Example 6, when polypropylene glycol is added, the flowability decreases to such a low level that slipping of the resin takes place in the molder and molding could not be performed.

By comparing Application Example 1 and Comparative Example 1, it can be seen that when the amount of the block copolymer, which has an amorphous polymer that forms the elastic domain at room temperature as the central portion and has polyethylene glycol chains with a molecular weight of 2000 or larger at two ends, added is too small, improvement of the elongation at break and impact strength is insufficient. On the other hand, when the amount of the block copolymer added is too large, as in Comparative Example 2, the flowability and the melt stability degrade.

By comparing Application Examples 2, 3, and 5, it can be seen that for both the amorphous polymer that forms the elastic domain at room temperature in the central portion of the block copolymer and the polyethylene glycol chains at the two ends, the larger the molecular weight, the better the properties.

By comparing Application Example 2 and Application Example 4, it can be seen that although they are both compounds with excellent properties, there is a difference in properties for different types of polyacetals.

By comparing Application Example 1 and Application Example 6, Application Example 2 and Application Examples 8–9, Application Example 2 and Application Example 12, Application Example 2 and Application Example 13, Application Example 3 and Application Example 7, Application Example 3 and Application Example 10, and Application Example 3 and Application Example 11, it can be seen that by adding compounds having epoxy groups and/or oxazolyl groups, it is possible to improve the melt stability.

It is estimated that the concentrations of potassium in the block copolymers used in Application Examples 3, 14, and 15 are at least 400 ppm, less than 10 ppm, and less than 250 ppm, respectively. By comparing Application Examples 3, 14, and 15, it can be seen that the lower the concentration of potassium in the composition, the higher the melt stability.

Effect of the invention

This invention can provide a polyacetal composition with improved toughness, wear resistance, and flowability that is appropriate for manufacturing gears, zippers, buckles, cassette hubs, and other mechanical parts.

What is claimed is:

1. A polyacetal composition, consisting of:
   (a) about 95–99.5 wt % of a polyacetal polymer; and
   (b) about 0.5–5 wt % of a block copolymer, said block copolymer having its central portion made of amorphous polypropylene glycol having a number average molecular weight of 2000 or higher that forms an elastic domain at room temperature and further having polyethylene glycol chains at each end;
   the above stated percentages being based on the total weight of components (a) and (b) only.

2. A polyacetal composition, comprising:
   (a) about 80–99.3 wt % of polyacetal polymer;
   (b) about 0.5–5 wt % of a block copolymer which has its central portion made of amorphous polypropylene glycol having a number average molecular weight of 2000 or higher that forms an elastic domain at room temperature and which has polyethylene glycol chains with a number average molecular weight of 2000 or higher at its two ends; and
   (c) about 0.2–15 wt % of a compound having epoxy groups;
   the above stated percentages being based on the total weight of components (a), (b) and (c) only.

3. The polyacetal composition of claim 1 or 2, wherein said block copolymer includes an alkali metal or alkaline-earth metal concentration of about 200 ppm or less.

4. A polyacetal composition according to claim 2, wherein component (c) is present in an amount of about 0.5–5 wt %.

5. A polyacetal composition according to claim 1, wherein component (b) is present in an amount of about 0.5–3 wt %.

6. A polyacetal composition according to claim 2, wherein component (b) is present in an amount of about 0.5–3 wt %.

7. Molded articles comprising the polyacetal composition according to claim 1.

8. Molded articles comprising the polyactel composition according to claim 2.

9. A method for making polyacetal compositions with improved toughness, wear resistance, and flowability characteristics, which comprises the step of melt-blending about 95–99 wt % of a polyacetal polymer with about 0.5 wt % of a block copolymer,
   said block copolymer having its central portion made of amorphous polypropylene glycol having a number average molecular weight of 2000 or higher that forms an elastic domain at room temperature and further having polyethylene glycol chains with a number average molecular weight of 2000 or higher at its two ends.

10. Articles produced by shaping a composition made by the process of claim 9 in the form of gears, zippers, buckles and cassette hubs.

* * * * *